United States Patent
Newcomb et al.

(10) Patent No.: US 7,519,893 B2
(45) Date of Patent: Apr. 14, 2009

(54) BINARY DATA ENCODING/DECODING FOR PARALLEL BUS

(75) Inventors: Russell R. Newcomb, Morgan Hill, CA (US); William B. Simms, San Jose, CA (US)

(73) Assignee: nVidia Corporation, Santa Clara, CA (US)

( * ) Notice: Subject to any disclaimer, the term of this patent is extended or adjusted under 35 U.S.C. 154(b) by 0 days.

(21) Appl. No.: 11/752,088

(22) Filed: May 22, 2007

(65) Prior Publication Data

US 2007/0217312 A1 Sep. 20, 2007

Related U.S. Application Data

(63) Continuation-in-part of application No. 11/385,357, filed on Mar. 20, 2006, which is a continuation-in-part of application No. 11/251,405, filed on Oct. 14, 2005.

(51) Int. Cl.
*H03M 13/00* (2006.01)

(52) U.S. Cl. .................................. 714/758; 369/59.13

(58) Field of Classification Search .................. 341/59, 341/55; 375/286, 216; 711/103; 370/352; 714/776, 758; 369/59.13
See application file for complete search history.

(56) References Cited

U.S. PATENT DOCUMENTS

| | | | | |
|---|---|---|---|---|
| 4,677,421 A | * | 6/1987 | Taniyama | 341/59 |
| 5,243,628 A | * | 9/1993 | Moritoki et al. | 375/286 |
| 5,873,112 A | * | 2/1999 | Norman | 711/103 |
| 6,556,628 B1 | | 4/2003 | Poulton et al. | |
| 6,696,990 B2 | * | 2/2004 | Pascucci | 341/55 |
| 6,897,793 B1 | * | 5/2005 | Kim et al. | 341/59 |
| 6,934,324 B2 | * | 8/2005 | Yamazaki | 375/216 |
| 7,296,211 B2 | * | 11/2007 | Cole et al. | 714/776 |
| 2007/0036129 A1 | * | 2/2007 | Blanton | 370/352 |

OTHER PUBLICATIONS

Senthinathan, R. et al., "Application Specific CMOS Output Driver Circuit Design Techniques to Reduce Simultaneous Switching Noise", Dec. 2003, 6 pages, IEEE Journal.
Sim et al., "Multilevel Differential Encoding with Precentering for High-Speed Parallel Link Transceiver", Aug. 2005, 7 pages, vol. 40, No. 8, IEEE Journal.
Response to Office action, filed Sep. 26, 2008 in co-pending U.S. Appl. No. 11/251,405.
Office action, mailed Sep. 5, 2008 in co-pending U.S. Appl. No. 11/385,357.
Response to Non-Final Office Action for related U.S. Appl. No. 11/385,357 dated Jan. 5, 2009.
Notice of Allowance for related U.S. Appl. No. 11/251,405 dated Nov. 12, 2008.

* cited by examiner

*Primary Examiner*—David Ton
(74) *Attorney, Agent, or Firm*—Berkeley Law & Technology Group, LLP

(57) ABSTRACT

Embodiments for binary encoding and/or decoding of data for transmission and/or reception over a data interconnect are disclosed. For an embodiment, a code may comprise a base portion, a subset of the base portion, a complement bit associated with the base portion, and a complement bit associated with the subset of the base portion.

20 Claims, 11 Drawing Sheets

BINARY DATA ENCODING/DECODING FOR PARALLEL BUS

This application is a continuation-in-part of U.S. patent application Ser. No. 11/385,357, filed Mar. 20, 2006, which is a continuation-in-part of U.S. patent application Ser. No. 11/251,405, filed Oct. 14, 2005.

BACKGROUND

This disclosure is related to data encoding and/or decoding for parallel busses.

As interfaces between components in computing platforms and/or between units within integrated circuits increase in transmission speed and/or bus width, noise and signal integrity issues increase in importance. For parallel data busses, for example data busses coupling memory devices to memory controllers, power supply variations and power supply noise may become issues due to relatively large changes in the ratio of '0' bits to '1' bits on the bus in consecutive cycles. Further, power consumption may vary with changes to the ratio of '0' bits to '1' bits on the bus over a period of time.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
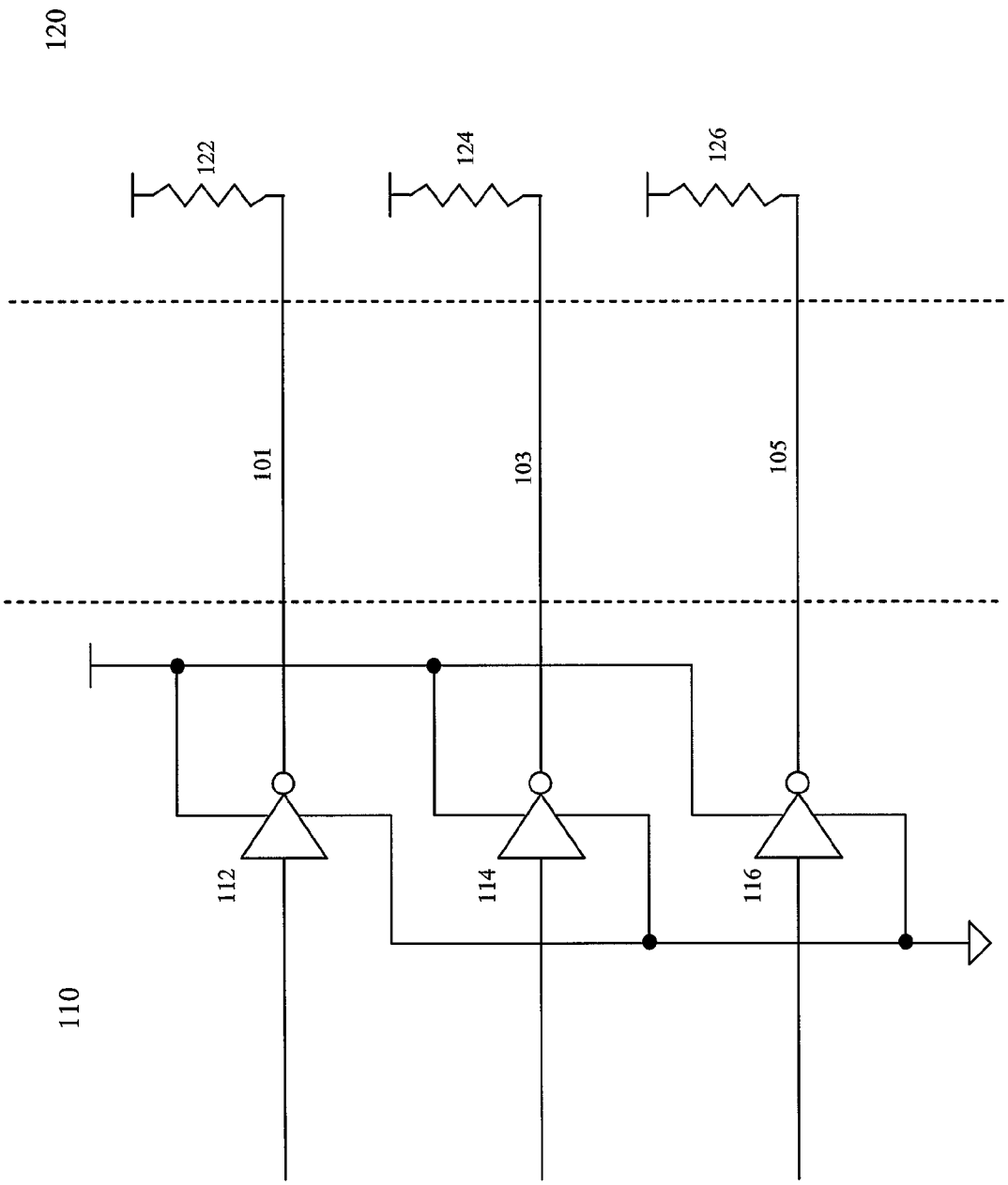
FIG. 1 is a schematic diagram including a plurality of output buffers each coupled to a power source.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As pointed out above, for parallel data busses, power supply variations and power supply noise may become issues due to relatively large changes in the ratio of '0' bits to '1' bits on the bus in consecutive cycles. Further, power consumption may vary with changes to the ratio of '0' bits to '1' bits on the bus over a period of time. A need, therefore, exists for techniques that may reduce power supply variations and/or power supply noise and/or reduce power consumption.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

FIG. 1 is a schematic diagram of a transmitting device 110 coupled to a receiving device 120. For this example, the transmitting device 110 includes output buffers 112, 114, and 116 which may each be connected to a power supply and ground. Also for this example, receiving device 120 includes resistors 122, 124, and 126 that may provide termination for data lines 101, 103, and 105. Although this example depicts only three data lines coupling transmitting device 110 and receiving device 120, other examples may include many more data lines and associated buffers.

As can be seen in FIG. 1, data lines 101, 103, and 105 may be driven or pulled-up to one of two states, either a logically high voltage level state or a logically low voltage level state. The use of two states to communicate information over a data line may be referred to as binary signaling. Other embodiments may include other states, for example a tri-state where the data lines are left floating. For this example embodiment, when a buffer is turned on, an associated data line is driven to a logically low voltage level. When the buffer is turned off, the associated data line is pulled to a logically high voltage level by a pull-up resistor at the receiving device. Although transmitting device 110 includes buffers that are capable of driving data lines to a logically low voltage level, other embodiments are possible. For example, other embodiments may include buffers that are capable of driving data lines to either a logically low voltage level or a logically high voltage level. Further, although receiving device 120 is depicted with resistors coupled to a logically high voltage level, a wide range of other configurations are possible, including, but not limited to, the use of resistors coupled to ground. A receiving device may comprise termination resistors coupled to any of a wide range of voltages.

As previously mentioned, when relatively large numbers of buffers of a parallel interface are turned on and/or change states at approximately the same time, extra demands may be made on a power supply resulting in supply voltage variations and/or noise. These supply voltage variations and/or noise may adversely effect signal integrity on data lines, thereby limiting the potential performance of the interface.

Figure 2:
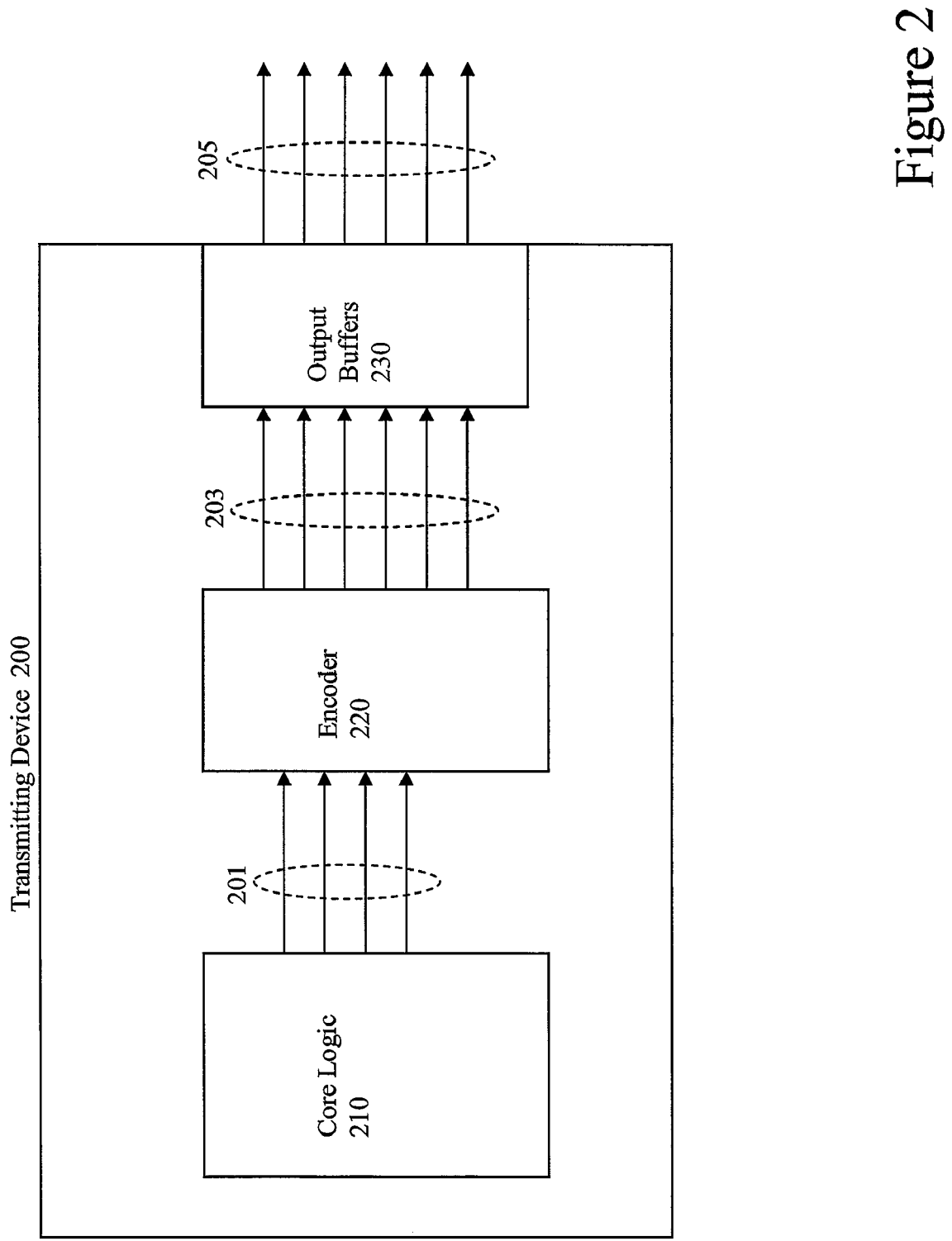
FIG. 2 is a block diagram of one embodiment of an example transmitting device.

In order to help avoid the potentially adverse effects of power supply variation and/or power supply noise, some embodiments may encode a number of data bits using codes that have approximately equal numbers of bits at each logical state. For example, FIG. 2 is a block diagram of one embodiment of an example transmitting device 200. Transmitting device 200 may include a core logic 210. For this example embodiment, core logic 210 may generate data delivered to an encoder 220 via four data lines 201. Encoder 220 may receive the data delivered via data lines 210 and may encode the received data using one of a number of codes. For this example embodiment, the codes may be derived from six bits. Thus, for this example, four data bits are encoded using six bit codes. For this example embodiment, each code includes three bits at a logically low level and three bits at a logically high level. Below is a table of codes for this example embodiment:

| Desired 4 bit data | Output 6 bit code |
|---|---|
| 0000 | 000111 |
| 0001 | 001011 |
| 0010 | 001101 |
| 0011 | 001110 |
| 0100 | 010011 |
| 0101 | 010101 |
| 0110 | 010110 |
| 0111 | 011001 |
| 1000 | 011010 |
| 1001 | 011100 |
| 1010 | 100011 |
| 1011 | 100101 |
| 1100 | 100110 |
| 1101 | 101001 |
| 1110 | 101010 |
| 1111 | 101100 |
| Special char 1 | 110001 |
| Special char 2 | 110010 |
| Special char 3 | 110100 |
| Special char 4 | 111000 |

As can be seen in the table of codes above, each of the six bit codes comprises three bits with a value of '0' and three bits with a value of '1'. Also, because the number of available six bit codes is greater than the number of four bit data combinations, several special characters may be implemented for any of a wide range of purposes. Although this example embodiment uses six bit codes to encode four bits of data, the claimed subject matter is not limited in this respect. Other embodiments are possible using any of a wide range of data bits and encoded data widths. For one example embodiment, ten bits may be used to encode eight data bits. Further, although this example embodiment uses equal numbers of '0' and '1' bits in each code, other embodiments are possible using unequal numbers of '0' and '1' bits.

Encoder 220 for this example embodiment may deliver encoded data via encoded data lines 203 to output buffers 230. Buffers 230 may in turn output six bit codes over a parallel data bus 205 which for this example comprises six data lines, although the claimed subject matter is not limited in this respect.

Parallel data bus 205 may be coupled to a receiving device such as device 300 discussed below in connection with FIG. 3. Because for this example embodiment each six bit code comprises equal numbers of '0' and '1' bits, for every data cycle the same number of buffers are turned on, thereby avoiding situation where relatively large changes in the ratio of '0' bits to '1' bits occur on the bus. Although for this example embodiment equal numbers of '0' and '1' bits are utilized for encoding, other embodiments are possible using unequal numbers of '0' and '1' bits.

As used herein, the term "approximately equal numbers of bits" is meant to include any ratio of bits at a first logical level and at a second logical level that avoids the situation where significantly more than half of the output buffers for a parallel interface are driving data lines to a first logical voltage level at one point in time then at a subsequent point in time significantly less than half of the output buffers for the parallel interface are driving data lines to the first logical voltage level.

In additional to helping reduce power supply variations and/or power supply noise, the example embodiments described herein, as well as other possible embodiments, may aid in the reduction of Electromagnetic Interference (EMI). Further, embodiments are possible where codes are selected in order to help reduce Simultaneous Switching Output (SSO) noise, which noise may occur when relatively large numbers of output buffers switch from one state to another concurrently.

Further, for some embodiments, error detection may be implemented. For example, in the six bit codes described above, there are equal numbers of bits at '0' and '1', and any time unequal numbers of '0' and '1' bits are detected at the receiving device, a single bit error may be indicated, although the claimed subject matter is not limited in these respects. In embodiments with unequal numbers of '0' and '1' bits, other error detection techniques may be used. For example, codes may be selected that always use an even number of '1' bits, and any time an odd number of '1' bits is detected at the receiving device, an error may be indicated, although again the claimed subject matter is not limited in these respects. In other embodiments, special characters, such as those described above, may be utilized to implement any of a wide range of error detection and/or correction methods.

Figure 3:
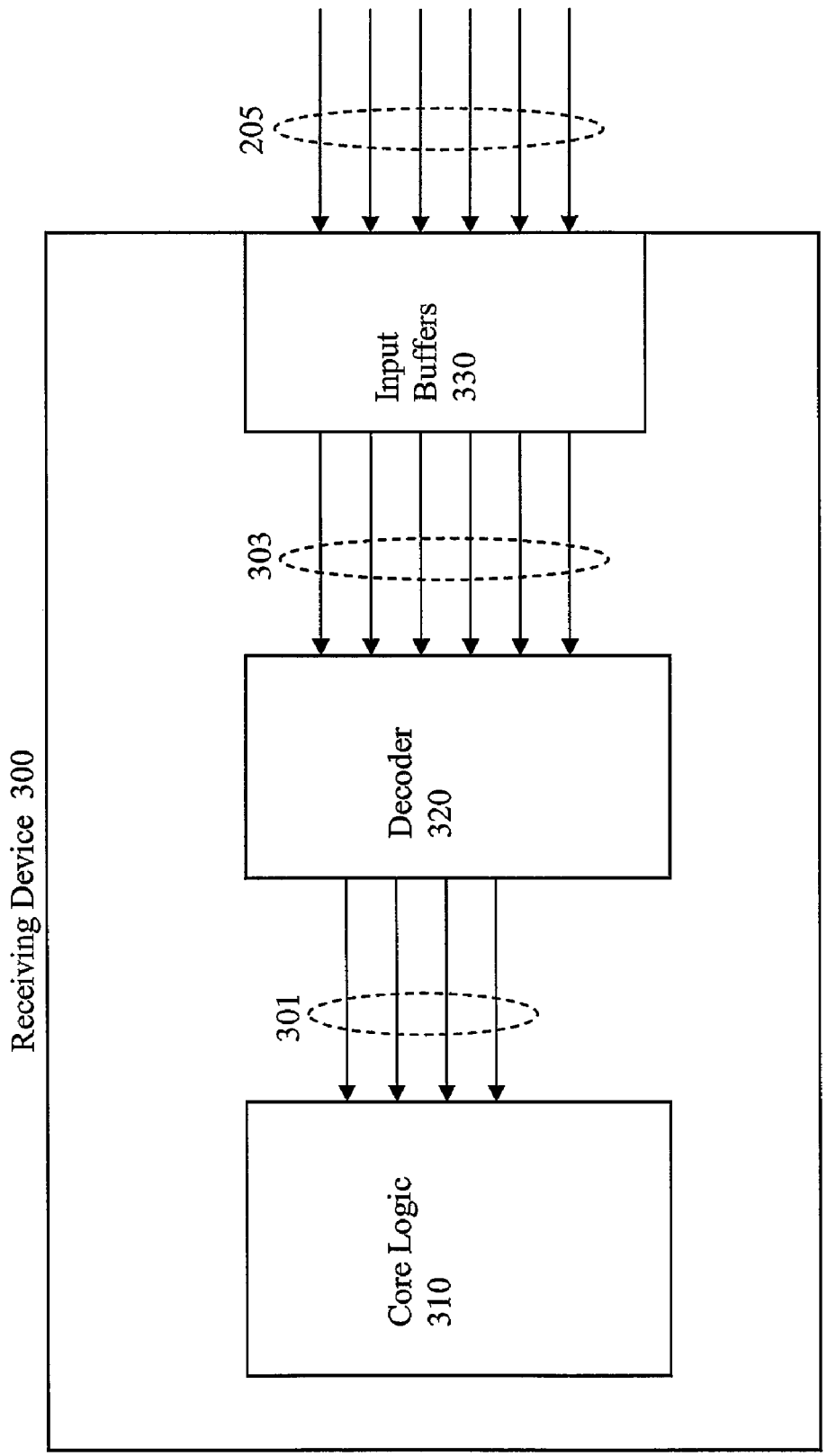
FIG. 3 is a block diagram of one embodiment of an example receiving device.

FIG. 3 is a block diagram of one embodiment of an example receiving device 300. For this example, receiving device 300 receives encoded data via parallel data bus 205. The encoded data bits may be received at input buffers 330 and passed on to a decoder unit 320 via encoded data lines 303. For this example, decoder 320 may decode the received six bit encoded data to produce four bits of data which may be delivered to a core logic 310 via data lines 301. Although this example embodiment decodes six bit codes to produce four decoded data bits, the claimed subject matter is not limited in this respect and other embodiments are possible using any of a wide range of data bits and encoded data widths.

The example embodiment above describes a transmitting device coupled to a receiving device via a parallel data bus. The transmitting and receiving devices may comprise any of a wide range of devices and/or components, including, but not limited to, central processing units (CPU), graphics processing units (GPU), memory devices, etc. For example, the transmitting device may comprise a graphics processing unit (GPU) and the receiving device may comprise a memory device. For another example, the transmitting device may comprise a memory device and the receiving device may comprise a GPU.

Figure 4:
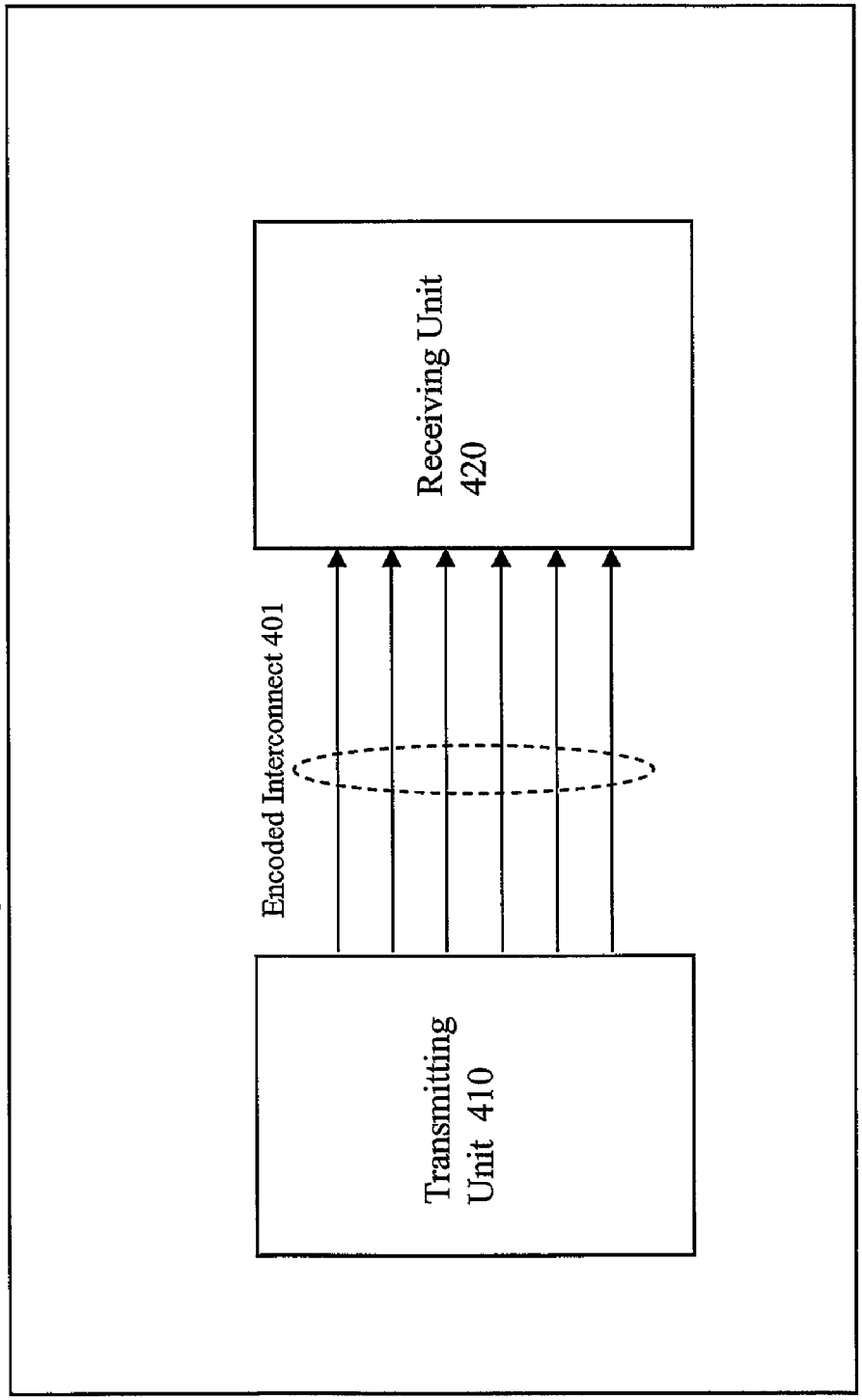
FIG. 4 is a block diagram of an example integrated circuit device comprising example embodiments of a transmitting unit and a receiving unit.

In addition to embodiments where the transmitting device and the receiving device comprise separate devices and/or components, other embodiments are possible where the example encoding techniques described herein are used to communicate data between units within a single integrated circuit device. For example, FIG. 4 is a block diagram of an example integrated circuit device 400 comprising example embodiments of a transmitting unit 410 and a receiving unit 420. Integrated circuit device 400 may comprise any of a wide range of devices and/or components, including, but not limited to, central processing units, graphics processing units, memory devices, etc. Transmitting unit 410 and receiving unit 420 for this example embodiment are coupled together via and encoded interconnect 401. Transmitting unit 410 may deliver encoded data to receiving unit 420 via the encoded interconnect 401. The encoding and decoding techniques used by transmitting unit 410 and receiving unit 420 may include any of the example techniques described herein. Further, other embodiments are possible where the transmitting unit resides on one integrated circuit die and the receiving unit 420 resides on a second integrated circuit die and the first die and the second die share a common package.

Figure 5:
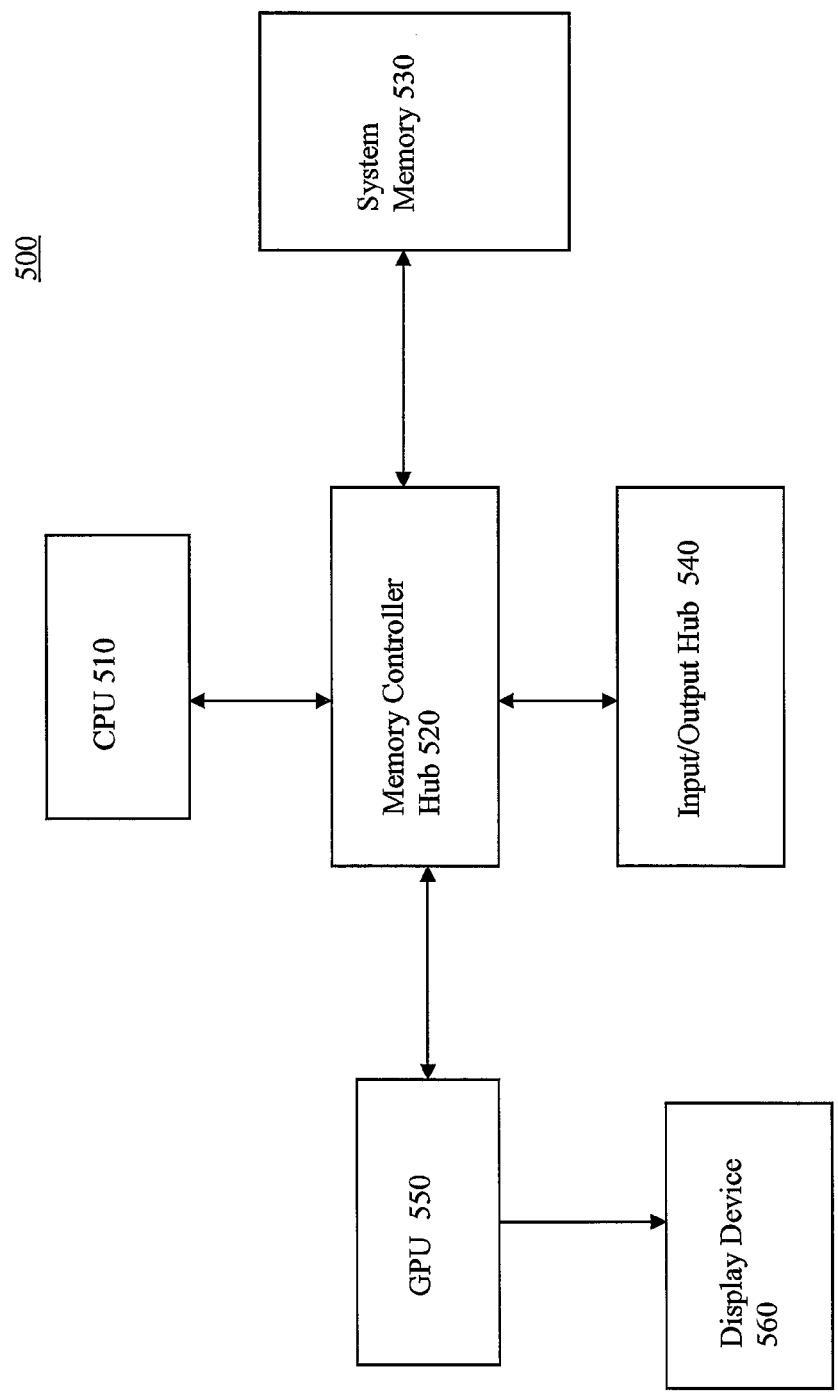
FIG. 5 is a block diagram of an example embodiment of a computing platform.

FIG. 5 is a block diagram of an example embodiment of a computing platform 500. Computing platform 500 includes a CPU 510 and a memory controller hub 520 coupled to CPU 510. Memory controller hub 520 is further coupled to a system memory 530, to a GPU 550, and to an input/output hub 540. GPU 550 is further coupled to a display device 560, which may comprise a CRT display, a flat panel LCD display, or other type of display device.

GPU 550 may comprise an integrated circuit device similar to that discussed above in connection with FIG. 4, where the device includes transmitting and receiving units to encode and decode data in accordance to any of the example encoding and decoding embodiments described herein. Further, the example encoding and decoding embodiments described herein may be utilized to transfer data between any of the components of computing platform 500. That is, any of the components of computing platform 500 may comprise transmitting devices and/or receiving devices configured in accordance with the example transmitting and receiving device embodiments described herein.

Although example system 500 is shown with a particular configuration of components, other embodiments are possible using any of a wide range of configurations. Further, the example embodiments described herein may be utilized in any of a wide range of electronic devices, including, but not limited to, computing platforms, gaming devices, cellular phones, personal digital assistants, music players, communications network components, etc.

Although the example embodiments described herein use parallel bus widths of either six or ten data lines, the claimed subject matter is not limited in this respect. Other embodiments are possible using any of a wide range of parallel bus widths. In some embodiments, wider busses may be implemented by combining two or more narrower bus lanes. For one example, thirty-two data bits may be encoded using four sets of codes where each code is ten bits wide, and the encoded data may be delivered from a transmitting device to a receiving device via forty data lines. For this example embodiment, codes may be utilized that ensure that no more than twenty four and at least sixteen data lines are driven to a first logical voltage level at a given time, although the claimed subject matter is not limited in this respect.

Figure 6:
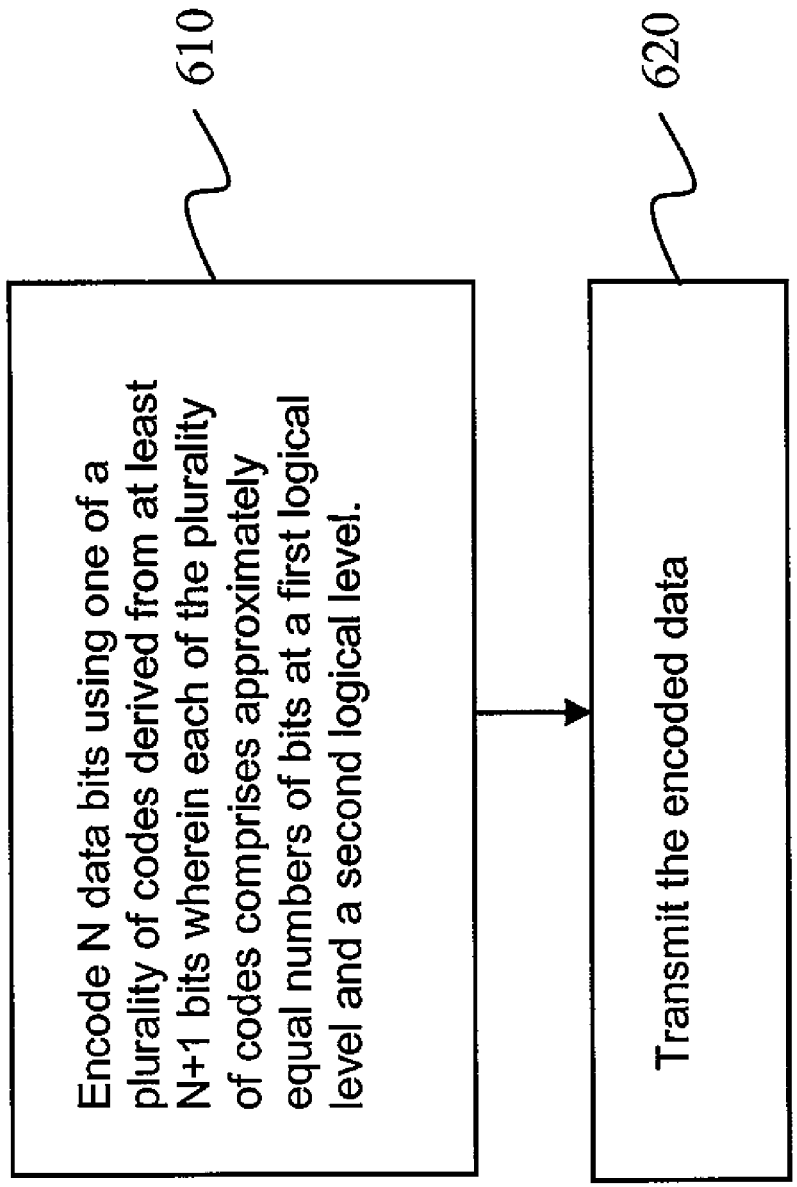
FIG. 6 is a flow diagram of an example embodiment of a method for encoding data.

FIG. 6 is a flow diagram of an example embodiment of a method for encoding data. At block 610, N data bits are encoded using one of a number of codes derived from at least N+1 bits. For this example embodiment, eight bits may be encoded using one of a number of codes derived from ten bits. Also for this example embodiment, each of the plurality of codes comprises approximately equal numbers of bits of a first logical level and of a second logical level. For this example, the first logical level may comprise a logical value of '0' and the second logical level may comprise a logical level of '1', although the claimed subject matter is not limited in this respect. At block 620, the encoded data is transmitted.

In another example embodiment, N data bits may be encoded using one of a plurality of codes derived from at least N+1 bits wherein the plurality of codes derived from the at least N+1 bits each comprise no more than M bits at a first logical level and at least M−2 bits at a second logical level. For one embodiment, encoding N bits may comprise encoding eight data bits using one of a plurality of codes derived from ten bits. For one embodiment, the ten bits may comprise no more than six bits at the first logical level and at least four bits at the second logical level.

Further, for another example embodiment, one of a plurality of codes derived from at least N+1 bits may be decoded to produce N decoded data bits. For this example embodiment, the plurality of codes derived from the at least N+1 bits may comprise no more than M bits at a first logical level and at least M−2 bits at a second logical level. For one embodiment, decoding a code derived from at least N+1 bits may comprise decoding one of a plurality of codes derived from ten bits to produce eight decoded bits. Also for this example embodiment, each of the plurality of codes derived from ten bits may comprise no more than six bits at the first logical level and at least four bits at the second logical level.

For one example embodiment, although the claimed subject matter is not limited in these respects, a method for selecting codes may be described as follows. A number of bits may be selected for a final encoded width W to replace a K width bus. The number of codes (if W is an even number) that have W/2 at logical level '1' and W/2 at logical level '0' may be determined. If there are fewer than $2^K$ codes, the search may be expanded to include (W/2)−1 codes at logical level '1' and (W/2)−1 codes at logical level '0'. Codes with (W/2)−1 codes at logical level '0' and (W/2)+1 codes at logical level '1' may also be included. If the number W is an odd number, codes that have (W−1)/2 at a logical level '1' and (W+1)/2 at a logical level '0' may be selected. Codes with (W−1)/2 at a logical level '0' and (W+1)/2 at a logical level '1' may also be included. If appropriate, additional output codes that are not as balanced may be selected.

For the example embodiments disclosed above, codes are selected so that for each data cycle an approximately equal number of one and zero bits are output. Other embodiments are possible where the numbers of one and zero bits are evened out over a period of time. For these embodiments, encoded data are transmitted over a parallel data interconnect, such as, for example, a memory interface. For example, for one data cycle a code that includes four '1' bits and six '0' bits may be output across the memory interface. For a subsequent data cycle, a code may be selected with six '1' bits and four '0' bits. Thus, over the course of the two data cycles the number of '1' and '0' bits are equalized. This concept may be expanded to include any number of data cycles. Counting circuitry within an encoding device may track the numbers of '1' bits output relative to the number of '0' bits output for a number of data cycles, and output codes may be selected in order to approximately equalize the amount of '1' bits and '0' bits output over the course of the number of data cycles. The counting circuitry may comprise a running correction counter capable of tracking a difference between the number of '0' bits and the number of '1' bits output to a parallel data interconnect over a plurality of data cycles. For one embodiment, rather than keeping a running count, an encoding device may set up a block of data words to be transmitted and choose codes for the block of words that may yield approximately a desired ratio of '0' to '1' bits for the block of data words. Thus, codes for the entire block may be selected prior to transmission of the block. Further, although the above examples describe equalizing the number of '0' and '1' bits transmitted over an interconnect over a period of time, other embodiments may seek to approximately maintain other ratios of '0' to '1' bits. Of course, these are merely examples of maintaining a desired ratio of '0' to '1' bits, and the claimed subject matter is not limited in these respects.

For some embodiments, a byte of data may be represented by a plurality of codes. Each of the plurality of codes associated with a particular data byte may have different ratios of '1' to '0' bits. An encoding device may select the most appropriate code to use for encoding the byte of data based at least in part on codes previously output by the encoding device. For some embodiments, encodings from the 8b/10b protocol may be used. 8b/10b encodings may comprise two possible codes (symbols) for each byte of data. Below is a table of possible encodings for several example data bytes. Of course, this is only a partial listing, and further, many other encodings are possible.

| Data Byte | First Possible Code | Second Possible Code |
|---|---|---|
| 00000000b | 1001110100b | 0110001011b |
| 00000001b | 0111010100b | 1000101011b |
| 00100100b | 1101011001b | 0010101001b |
| 11110010b | 0100110111b | 0100110001b |

As can be seen by observing the example data bytes and associated possible codes, some of the codes comprise equal numbers of '1' bits and '0' bits while other codes include either six '1' bits or six '0' bits. In selecting which of the two possible codes to use for each data byte, an encoding device may select the code that most closely equalizes the amount of '1' bits and '0' bits over a period of time. Consider the following example:

| Data Byte | Selected Output Code |
|---|---|
| 00100100b | 1101011001b |
| 00000000b | 1001110100b |

| Data Byte | Selected Output Code |
|---|---|
| 00000001b | 0111010100b |
| 11110010b | 0100110001b |

For this example, byte 00100100b is to be encoded. One of the possible codes associated with that data byte is selected. For this example, the selected output code 1101011001b includes six '1' bits and four '0' bits. The next data byte to be encoded is 00000000b, and one of the possible codes for that byte of data is selected. For this example, each of the possible bytes for that data byte include equal numbers of '1' and '0' bits. Similarly, the codes for the next data byte 00000001b include equal numbers of '1' and '0' bits. However, for the last data byte in this example, byte 11110010b has associated with it two possible codes. Each of the codes has different numbers of '1' and '0' bits. For this example, because the number of '1' bits for the sequence of the first three selected output codes exceeds the number of '0' bits, the code for byte 11110010b containing the fewest number of '1' bits is selected. By the end of the example sequence, an equal number of '1' bits and '0' bits will have been output from the encoding device. For some sequences, it may not be possible to completely equalize the numbers of '1' and '0' bits output over a period of time or over a number of clock cycles, but codes may be selected to keep the numbers of '1' and '0' bits as close to equal as possible, although the scope of the claimed subject matter is not limited in this respect.

Although the above example embodiment describes the use of 8b/10b encoding in a parallel context, other embodiments may use other encoding schemes. For one example, a data bus inversion bit may be used to invert part of a data byte. Whether the data bus inversion bit is set or not for each data cycle may depend on the whether greater or fewer '1' or '0' bits are desired in order to more closely equalize the number of '1' and '0' bits output over a period of time. For one example embodiment, the data bus inversion bit may be used to invert one half of a data byte.

Although some of the embodiments described herein include using codes to approximately equalize the amount of '1' and '0' bits either in a single data cycle or over a number of data cycles, other embodiments may include schemes to maximize the amount of '1' bits or to maximize the number of '0' bits transmitted over a period of time. Still other embodiments are possible where codes are selected to approximately maintain any predetermined ratio of '0' to '1' bits. For one example using a twenty bit parallel interconnect, it may be desirable to select codes that may maintain an approximate average of twelve '1' bits and eight '0' bits. The predetermined ratio of bits may be a programmable value. Possible ratios of '0' to '1' bits may include, but are not limited to, one-to-one, two-to-three, and three-to-two, etc. Some embodiments may utilize a data bus inversion scheme such as that described above to approximately maintain any predetermined ratio of '0' to '1' bits.

Figure 7:
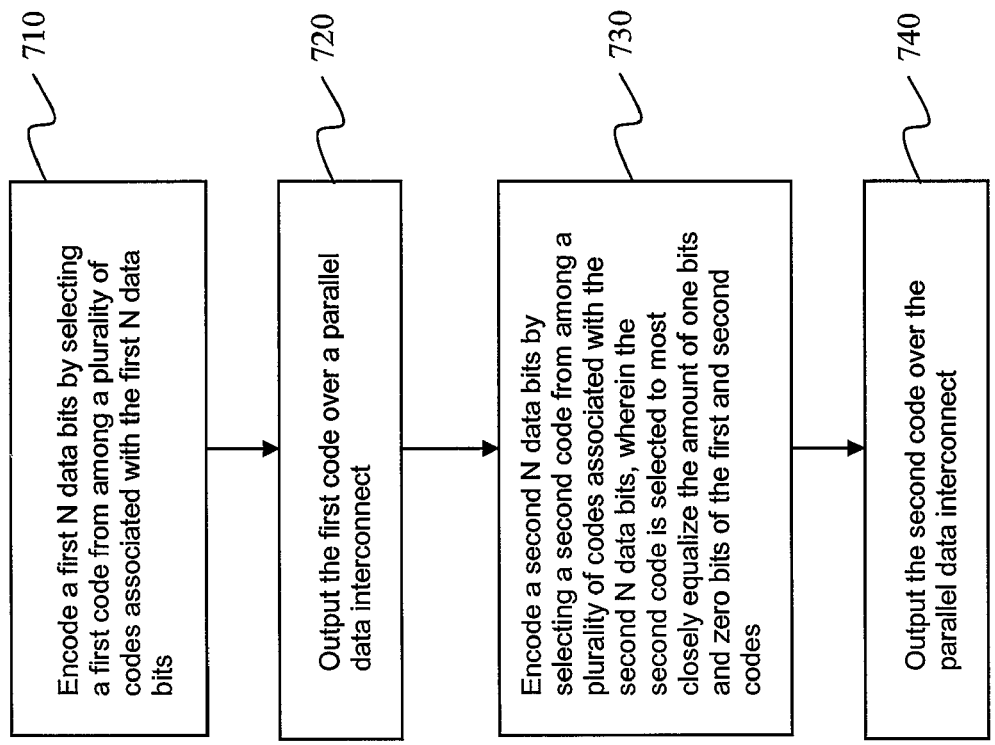
FIG. 7 is a flow diagram of an example embodiment of a method for encoding data.

FIG. 7 is a flow diagram of an embodiment for encoding data. At block 710, a first N data bits are encoded by selecting a first code from among plurality of codes associated with the first N data bits. At block 720, the first code is output over a parallel data interconnect. At block 730, a second N data bits are encoded by selecting a second code from among a plurality of codes associated with the second N data bits, wherein the second code is selected to most closely equalize the amount of one bit and zero bits of the first and second codes.

The second code is output over the parallel data interconnect at block 740. An embodiment in accordance with claimed subject matter may include all, more than all or less than all of blocks 710-740. Furthermore the order of blocks 710-740 is merely one example order, and the scope of the claimed subject matter is not limited in this respect.

Figure 8:
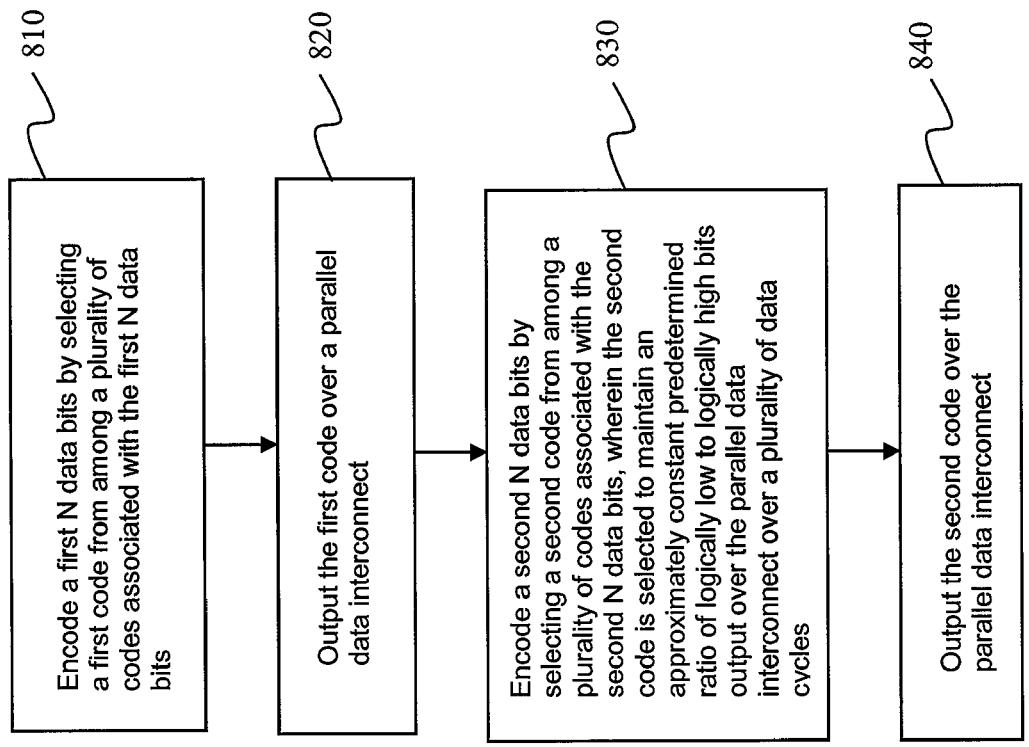
FIG. 8 is a flow diagram of an example embodiment of a method for encoding data.

FIG. 8 is a flow diagram of an embodiment for encoding data. At block 810, a first N data bits are encoded by selecting a first code from among plurality of codes associated with the first N data bits. At block 820, the first code is output over a parallel data interconnect. At block 830, a second N data bits are encoded by selecting a second code from among a plurality of codes associated with the second N data bits, wherein the second code is selected to maintain an approximately constant predetermined ratio of logically low to logically high bits output over the parallel data interconnect over a plurality of data cycles. For one embodiment, the predetermined ratio may comprise a one-to-one ratio. Other embodiments may use other predetermined ratios. The second code is output over the parallel data interconnect at block 840. An embodiment in accordance with claimed subject matter may include all, more than all or less than all of blocks 810-840. Furthermore, the order of blocks 810-840 is merely one example order, and the scope of the claimed subject matter is not limited in this respect.

Figure 9:
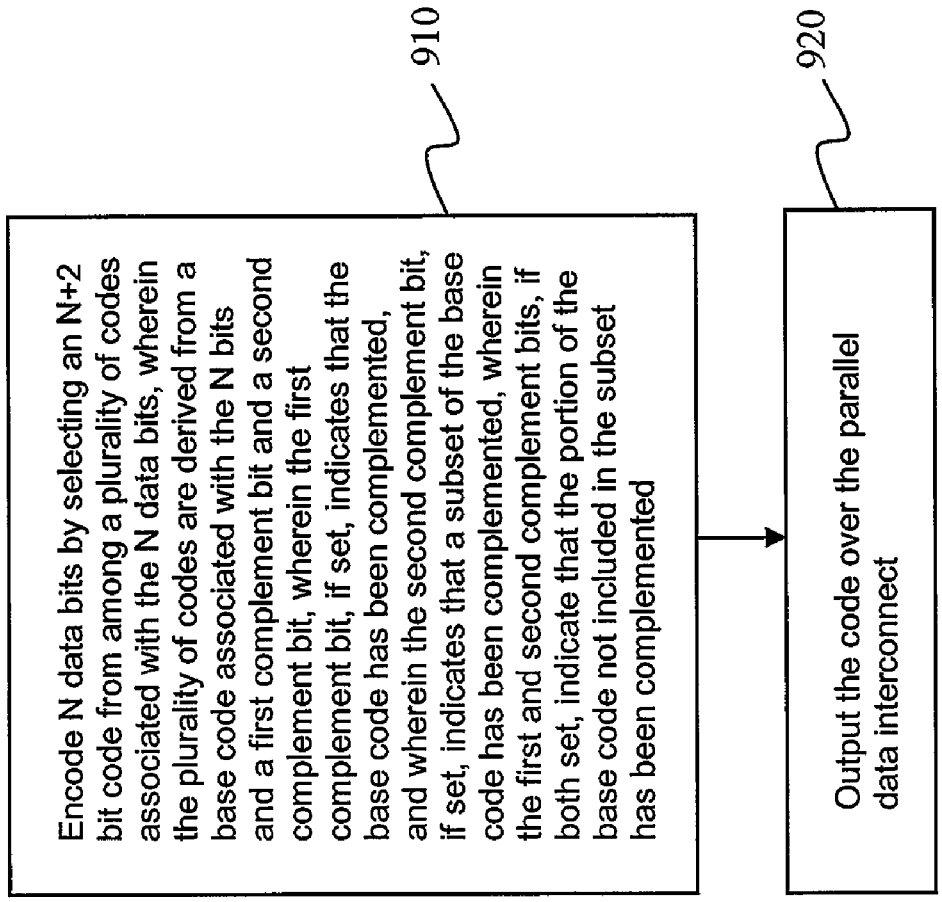
FIG. 9 is a flow diagram of an example embodiment of a method for encoding data.
Figure 10:
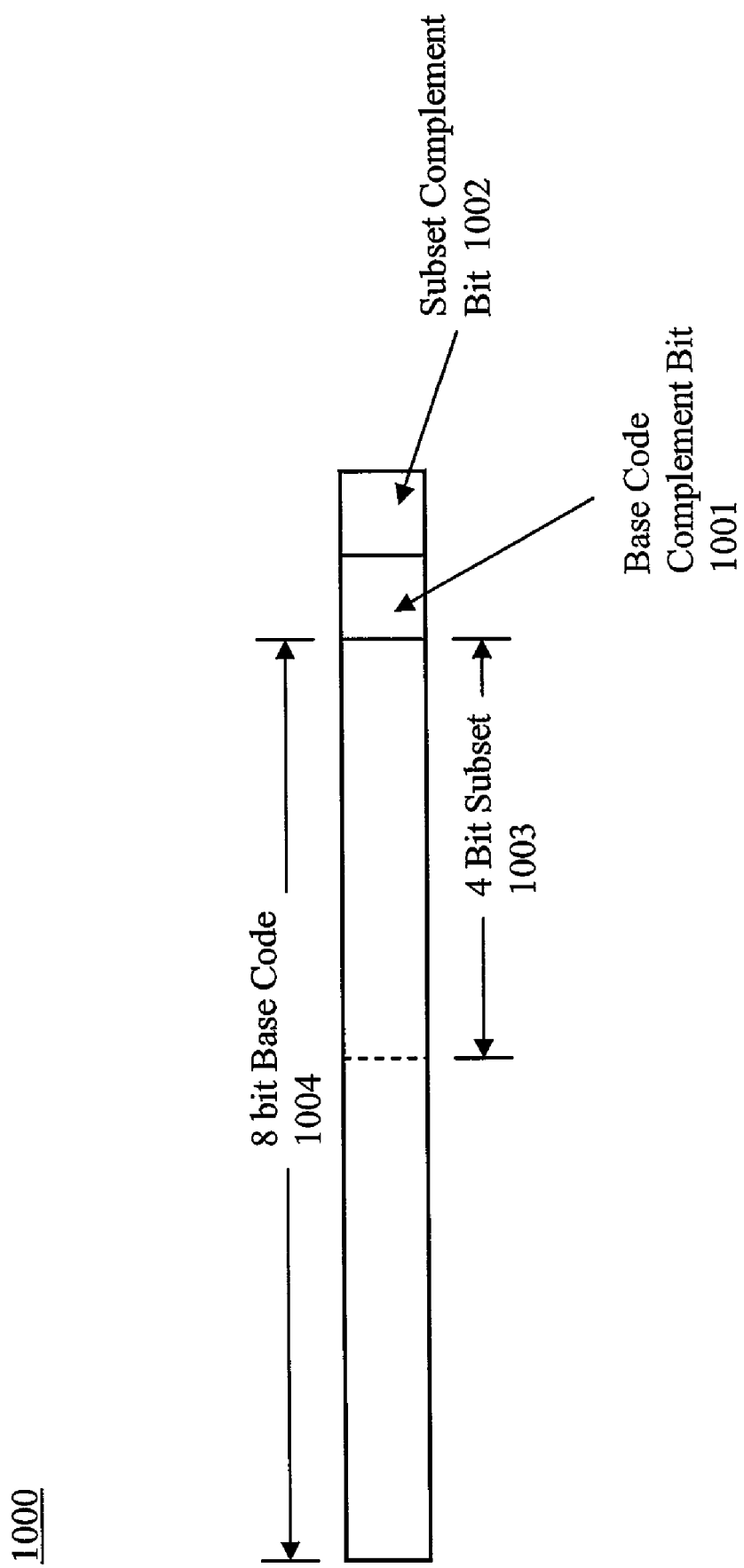
FIG. 10 is a block diagram of an example code format including a base code and complement bits.
Figure 11:
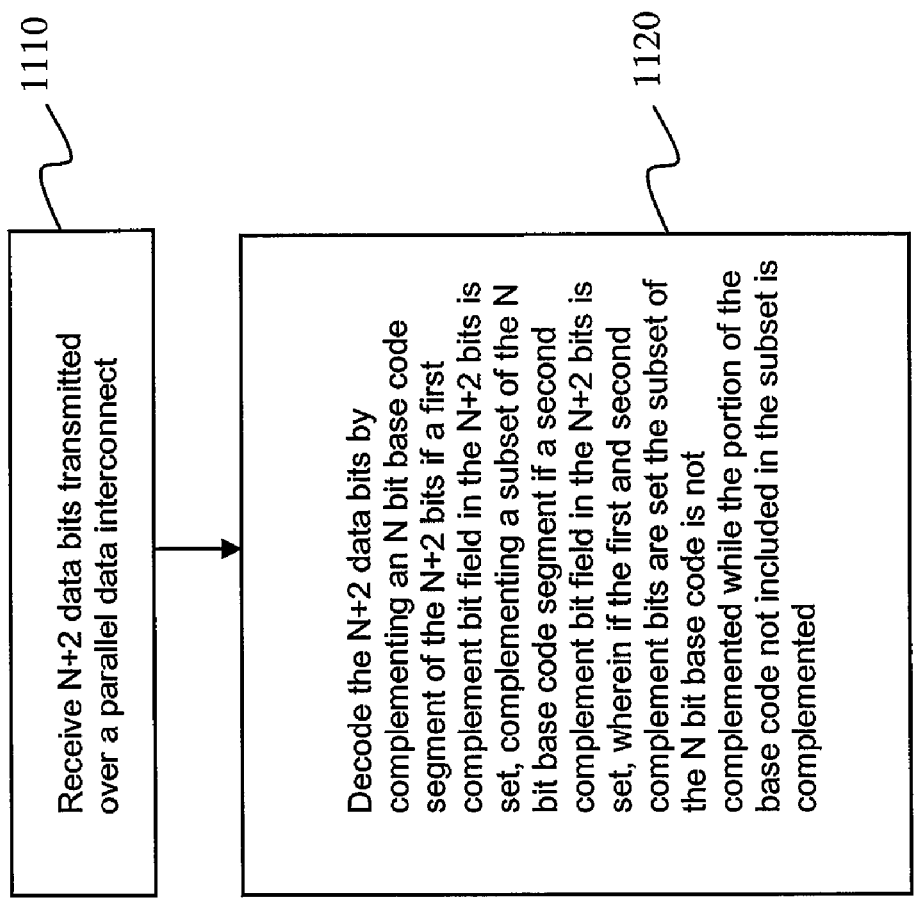
FIG. 11 is a flow diagram of an example embodiment of a method for decoding data.

FIGS. 9 through 11, and the corresponding discussion below, describe an additional example embodiment of methods for encoding and/or decoding data. Embodiments of these methods may be implemented in devices and/or systems such as those described above in connection with FIGS. 2-5. For these embodiments, codes may be chosen to represent blocks of data in a way that minimizes the number of lines on a parallel interconnect that switch from one logical voltage level to another in transitioning from one data cycle to another, thus reducing SSO noise. Codes may also be chosen to maximize the number of lines on the parallel interconnect that are at a desired, predetermined logical voltage level. For example, for parallel interconnects that are terminated at a logically high voltage level at a receiving device, perhaps through a pull-up resistor, power consumption can be minimized if the number of data lines on the parallel interconnect at the logically high voltage level can be maximized. In an embodiment, codes may be chosen to maximize the number of "1s" on the interconnect over a period of time, thus minimizing power consumption. In another embodiment, perhaps useful when a receiving device is terminated at a logically low voltage level, codes may be selected to maximize the number of "0s" on the interconnect over a period of time, again minimizing power consumption. Other ratios of "1s" to "0s" on the parallel interconnect over a period of time may also be targeted. For example, for an embodiment it may be desirable to target a 3:1 ratio, or a 2:3 ratio, or some other ratio, of ones to zeros on the parallel interconnect over a period of time. However, these are merely examples of ratios of ones to zeros that may be output over the parallel interconnect over a period of time, and the scope of the claimed subject matter is not limited in this respect.

FIG. 9 is a flow diagram of an example embodiment of a method for encoding data. For this example embodiment, as depicted at block 910, N bits are encoded by selecting an N+2 bit code from among a plurality of codes associated with the N data bits. The plurality of codes are derived from a base code associated with the N bits as well as a first complement bit and a second complement bit. For this example, a setting of the first complement bit indicates that the base code has been complemented. A setting of the second complement bit indicates that a subset of the base code has been complemented, and a setting of both the first and second complement bits indicates that the portion of the base code not included in the subset has been complemented. The setting of the first and second complement bits in effect indicates that the entire base code has been complemented, and further indicates in effect that the subset has been re-complemented (double complementing the subset), in effect leaving the subset un-complemented. Thus, a setting of both the first and second complement bits indicates that the portion of the base code not included in the subset has been complemented. At block 920, the selected code is output over a parallel data interconnect. An embodiment in accordance with claimed subject matter may include all, more than all or less than all of blocks 910-920, and the scope of the claimed subject matter is not limited in this respect.

As used herein, the terms "complement" and "complemented" are synonymous with "invert" and "inverted", respectfully. Thus, the complement of a four bit field with values 1010 is 0101.

FIG. 10 depicts an example format for a code 1000 in accordance with an embodiment. Code 1000 for this example comprises an eight bit base code 1004 that includes a four bit subset 1003, although the scope of the claimed subject matter is not limited in these regards. For an embodiment, the subset field may not be contiguous. For example, the subset may comprise the odd bits of the base code. For another embodiment, the subset may comprise the even bits of the base code. However, these are merely examples of formats for the subset, and the scope of the claimed subject matter is not limited in this respect. Code 1000 also comprises a base code complement bit 1001 and a subset complement bit 1002. The complement bits 1001 and 1002 may, in combination, indicate four variation of the base code. For example, assume a base code of 11001010. For this example, the subset comprises 1010. If both complement bits are not set, the resulting ten bit code would be 1100101000. If the base code complement bit 1001 is set, the resulting ten bit code becomes 0011010110. As can be seen, is this case the entire base code has been complemented (inverted), and the remaining two bits comprise the set base code complement bit and the non-set subset complement bit.

Starting again from a base code of 11001010, if the subset complement bit is set and the base code complement bit is not set, the resulting ten bit code would be 1100010101. As can be seen, only the subset has been complemented. In the case of both the base code complement bit and the subset complement bit being set, the base code is first complemented and then the subset is in effect complemented again, resulting in a code where the portion of the base code not included in the subset is complemented. The resulting ten bit code would be 0011101011. Thus, from a base code of 11001010, four possible codes are formed depending on the state of the two complement bits.

By way of further explanation, ten bit symbols S[0:9] may be used to represent an eight bit data word D[0:7]. A mapping from S[0:9] to D[0:7] may be depicted according to the following (where "^" represents an exclusive OR operation):

D[7]=S[7]^S[8]
D[6]=S[6]^S[8]
D[5]=S[5]^S[8]
D[4]=S[4]^S[8]
D[3]=S[3]^S[8]^S[9]
D[2]=S[2]^S[8]^S[9]
D[1]=S[1]^S[8]^S[9]
D[0]=S[0]^S[8]^S[9]

Thus, for this example, every 8 bit data word has 4 different possible codes. The various codes available for each base code may be used advantageously in various applications. For example, to reduce SSO noise, it may be desirable to reduce the number of lines on a parallel interconnect that switch from one logical voltage level to another upon data cycle transitions. A code for a current block of data may be selected depending on the state of the various lines that make up the parallel interconnect. Consider the following example:

Assume that a previous byte of data was encoded and output onto a parallel interconnect with the code 1100101011. Also, assume that a current byte of data to be encoded has the value 10011010. According to the encoding scheme described above, this code will have four possible ten bit code variations that may be used. They are listed below, along with the number of transitions that would occur on the parallel interconnect if used:

A: 1001101000 (4 transitions)
B: 0101010110 (7 transitions)
C: 1001010101 (7 transitions)
D: 0110101011 (2 transitions)

Thus, for this example, a possible option for minimizing SSO noise is code D with its resulting two transitions, and code D may be selected and output onto the parallel interconnect. For the eight-to-ten bit encoding example embodiment described above, the maximum number of transitions from one output code to another is three transitions.

As previously mentioned, the encoding scheme described above may also be used to minimize power consumption. In the case where the lines of a parallel interconnect have fixed pull-up resistors, power savings may result by maximizing the number of lines of the interconnect at a logically high voltage level. This may be accomplished by always choosing a code from among the several possibilities with the most bits at "1". In other embodiments, for example where the lines of a parallel interconnect are terminated to ground instead of through a pull-up resistor, is may be advantageous us to maximize the number of lines of the interconnect at a logically low voltage level, and codes with the most bits at "0" may be selected.

Below is an example listing of codes where the number of bits at "1" is maximized. Note that the maximum number of bits with the value "0" for any code is four. The table for this example is as follows, and of course the scope of the claimed subject matter is not limited by this example:

| D[0:7]   | S[0:9]     |
|----------|------------|
| 00000000 | 1111111110 |
| 00000001 | 1111111010 |
| 00000010 | 1111110110 |
| 00000011 | 1111001111 |
| 00000100 | 1111101110 |
| 00000101 | 1111010111 |
| 00000110 | 1111011011 |
| 00000111 | 1111011111 |
| 00001000 | 1111011110 |
| 00001001 | 1111100111 |
| 00001010 | 1111101011 |
| 00001011 | 1111101111 |
| 00001100 | 1111110011 |
| 00001101 | 1111110111 |
| 00001110 | 1111111011 |
| 00001111 | 1111111111 |
| 00010000 | 1110111110 |
| 00010001 | 1110111010 |
| 00010010 | 1110110110 |
| 00010011 | 1110001111 |
| 00010100 | 1110101110 |
| 00010101 | 1110010111 |
| 00010110 | 1110011011 |

-continued

| D[0:7]   | S[0:9]     |
|----------|------------|
| 00010111 | 1110011111 |
| 00011000 | 1110011110 |
| 00011001 | 1110100111 |
| 00011010 | 1110101011 |
| 00011011 | 1110101111 |
| 00011100 | 1110110011 |
| 00011101 | 1110110111 |
| 00011110 | 1110111011 |
| 00011111 | 1110111111 |
| 00100000 | 1101111110 |
| 00100001 | 1101111010 |
| 00100010 | 1101110110 |
| 00100011 | 1101001111 |
| 00100100 | 1101101110 |
| 00100101 | 1101010111 |
| 00100110 | 1101011011 |
| 00100111 | 1101011111 |
| 00101000 | 1101011110 |
| 00101001 | 1101100111 |
| 00101010 | 1101101011 |
| 00101011 | 1101101111 |
| 00101100 | 1101110011 |
| 00101101 | 1101110111 |
| 00101110 | 1101111011 |
| 00101111 | 1101111111 |
| 00110000 | 1100111110 |
| 00110001 | 1100111010 |
| 00110010 | 1100110110 |
| 00110011 | 1100001111 |
| 00110100 | 1100101110 |
| 00110101 | 1100010111 |
| 00110110 | 1100011011 |
| 00110111 | 1100011111 |
| 00111000 | 1100011110 |
| 00111001 | 1100100111 |
| 00111010 | 1100101011 |
| 00111011 | 1100101111 |
| 00111100 | 1100110011 |
| 00111101 | 1100110111 |
| 00111110 | 1100111011 |
| 00111111 | 1100111111 |
| 01000000 | 1011111110 |
| 01000001 | 1011111010 |
| 01000010 | 1011110110 |
| 01000011 | 1011001111 |
| 01000100 | 1011101110 |
| 01000101 | 1011010111 |
| 01000110 | 1011011011 |
| 01000111 | 1011011111 |
| 01001000 | 1011011110 |
| 01001001 | 1011100111 |
| 01001010 | 1011101011 |
| 01001011 | 1011101111 |
| 01001100 | 1011110011 |
| 01001101 | 1011110111 |
| 01001110 | 1011111011 |
| 01001111 | 1011111111 |
| 01010000 | 1010111110 |
| 01010001 | 1010111010 |
| 01010010 | 1010110110 |
| 01010011 | 1010001111 |
| 01010100 | 1010101110 |
| 01010101 | 1010010111 |
| 01010110 | 1010011011 |
| 01010111 | 1010011111 |
| 01011000 | 1010011110 |
| 01011001 | 1010100111 |
| 01011010 | 1010101011 |
| 01011011 | 1010101111 |
| 01011100 | 1010110011 |
| 01011101 | 1010110111 |
| 01011110 | 1010111011 |
| 01011111 | 1010111111 |
| 01100000 | 1001111110 |
| 01100001 | 1001111010 |
| 01100010 | 1001110110 |
| 01100011 | 1001001111 |

-continued

| D[0:7] | S[0:9] |
|---|---|
| 01100100 | 1001101110 |
| 01100101 | 1001010111 |
| 01100110 | 1001011011 |
| 01100111 | 1001011111 |
| 01101000 | 1001011110 |
| 01101001 | 1001100111 |
| 01101010 | 1001101011 |
| 01101011 | 1001101111 |
| 01101100 | 1001110011 |
| 01101101 | 1001110111 |
| 01101110 | 1001111011 |
| 01101111 | 1001111111 |
| 01110000 | 0111111101 |
| 01110001 | 0111111001 |
| 01110010 | 0111110101 |
| 01110011 | 0111110001 |
| 01110100 | 0111101101 |
| 01110101 | 0111101001 |
| 01110110 | 0111100101 |
| 01110111 | 0111011100 |
| 01111000 | 0111011101 |
| 01111001 | 0111011001 |
| 01111010 | 0111010101 |
| 01111011 | 0111101100 |
| 01111100 | 0111001101 |
| 01111101 | 0111110100 |
| 01111110 | 0111111000 |
| 01111111 | 0111111100 |
| 10000000 | 0111111110 |
| 10000001 | 0111111010 |
| 10000010 | 0111110110 |
| 10000011 | 0111001111 |
| 10000100 | 0111101110 |
| 10000101 | 0111010111 |
| 10000110 | 0111011011 |
| 10000111 | 0111011111 |
| 10001000 | 0111011110 |
| 10001001 | 0111100111 |
| 10001010 | 0111101011 |
| 10001011 | 0111101111 |
| 10001100 | 0111110011 |
| 10001101 | 0111110111 |
| 10001110 | 0111111011 |
| 10001111 | 0111111111 |
| 10010000 | 0110111110 |
| 10010001 | 0110111010 |
| 10010010 | 0110110110 |
| 10010011 | 0110001111 |
| 10010100 | 0110101110 |
| 10010101 | 0110010111 |
| 10010110 | 0110011011 |
| 10010111 | 0110011111 |
| 10011000 | 0110011110 |
| 10011001 | 0110100111 |
| 10011010 | 0110101011 |
| 10011011 | 0110101111 |
| 10011100 | 0110110011 |
| 10011101 | 0110110111 |
| 10011110 | 0110111011 |
| 10011111 | 0110111111 |
| 10100000 | 0101111110 |
| 10100001 | 0101111010 |
| 10100010 | 0101110110 |
| 10100011 | 0101001111 |
| 10100100 | 0101101110 |
| 10100101 | 0101010111 |
| 10100110 | 0101011011 |
| 10100111 | 0101011111 |
| 10101000 | 0101011110 |
| 10101001 | 0101100111 |
| 10101010 | 0101101011 |
| 10101011 | 0101101111 |
| 10101100 | 0101110011 |
| 10101101 | 0101110111 |
| 10101110 | 0101111011 |
| 10101111 | 0101111111 |
| 10110000 | 1011111101 |
| 10110001 | 1011111001 |
| 10110010 | 1011110101 |
| 10110011 | 1011110001 |
| 10110100 | 1011101101 |
| 10110101 | 1011101001 |
| 10110110 | 1011100101 |
| 10110111 | 1011011100 |
| 10111000 | 1011011101 |
| 10111001 | 1011011001 |
| 10111010 | 1011010101 |
| 10111011 | 1011101100 |
| 10111100 | 1011001101 |
| 10111101 | 1011110100 |
| 10111110 | 1011111000 |
| 10111111 | 1011111100 |
| 11000000 | 0011111110 |
| 11000001 | 0011111010 |
| 11000010 | 0011110110 |
| 11000011 | 0011001111 |
| 11000100 | 0011101110 |
| 11000101 | 0011010111 |
| 11000110 | 0011011011 |
| 11000111 | 0011011111 |
| 11001000 | 0011011110 |
| 11001001 | 0011100111 |
| 11001010 | 0011101011 |
| 11001011 | 0011101111 |
| 11001100 | 0011110011 |
| 11001101 | 0011110111 |
| 11001110 | 0011111011 |
| 11001111 | 0011111111 |
| 11010000 | 1101111101 |
| 11010001 | 1101111001 |
| 11010010 | 1101110101 |
| 11010011 | 1101110001 |
| 11010100 | 1101101101 |
| 11010101 | 1101101001 |
| 11010110 | 1101100101 |
| 11010111 | 1101011100 |
| 11011000 | 1101011101 |
| 11011001 | 1101011001 |
| 11011010 | 1101010101 |
| 11011011 | 1101101100 |
| 11011100 | 1101001101 |
| 11011101 | 1101110100 |
| 11011110 | 1101111000 |
| 11011111 | 1101111100 |
| 11100000 | 1110111101 |
| 11100001 | 1110111001 |
| 11100010 | 1110110101 |
| 11100011 | 1110110001 |
| 11100100 | 1110101101 |
| 11100101 | 1110101001 |
| 11100110 | 1110100101 |
| 11100111 | 1110011100 |
| 11101000 | 1110011101 |
| 11101001 | 1110011001 |
| 11101010 | 1110010101 |
| 11101011 | 1110101100 |
| 11101100 | 1110001101 |
| 11101101 | 1110110100 |
| 11101110 | 1110111000 |
| 11101111 | 1110111100 |
| 11110000 | 1111111101 |
| 11110001 | 1111111001 |
| 11110010 | 1111110101 |
| 11110011 | 1111110001 |
| 11110100 | 1111101101 |
| 11110101 | 1111101001 |
| 11110110 | 1111100101 |
| 11110111 | 1111011100 |
| 11111000 | 1111011101 |
| 11111001 | 1111011001 |
| 11111010 | 1111010101 |
| 11111011 | 1111101100 |
| 11111100 | 1111001101 |
| 11111101 | 1111110100 |

-continued

| D[0:7] | S[0:9] |
|---|---|
| 11111110 | 1111111000 |
| 11111111 | 1111111100 |

FIG. 11 is a flow diagram of an example embodiment of a method for decoding data that has been encoded according to the embodiments described above in connection with FIGS. 9 and 10. At block 1110, N+2 data bits transmitted over a parallel data interconnect are received. At block 1120, the N+2 data bits are decoded by complementing an N bit base code segment of the N+2 bits if a first complement bit field in the N+2 bits is set. If a second complement field in the N+2 bits is set, a subset of the N bit base code segment is complemented. If both the first and second complement bits are set, the subset of the N bit base code is not complemented, while the portion of the base code not included in the subset is complemented. An embodiment in accordance with claimed subject matter may include all, more than all or less than all of blocks 1110-1120, and the scope of the claimed subject matter is not limited in this respect.

Although some of the example embodiments described herein use parallel bus widths of ten data lines (eight data bits encoded onto ten data lines), the claimed subject matter is not limited in this respect. Other embodiments are possible using any of a wide range of parallel bus widths. In some embodiments, wider busses may be implemented by combining two or more narrower bus lanes. For one example, thirty-two data bits may be encoded using four sets of codes where each code is ten bits wide, and the encoded data may be delivered from a transmitting device to a receiving device via forty data lines. However, the scope of the claimed subject matter is not limited in this respect.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
encoding N data bits by selecting an at least N+2 bit code from among a plurality of codes associated with the N data bits, wherein the plurality of codes are derived from a base code associated with the N bits and a first complement bit and a second complement bit, wherein the first complement bit, if set, indicates that the base code has been complemented, and wherein the second complement bit, if set, indicates that a subset of the base code has been complemented, wherein the first and second complement bits, if both set, indicate that the portion of the base code not included in the subset has been complemented; and
transmitting the selected code over a data interconnect.

2. The method of claim 1, wherein encoding N data bits comprises encoding eight data bits.

3. The method of claim 2, wherein the subset of the base code comprises four data bits.

4. The method of claim 1, wherein said transmitting the selected code over a data interconnect comprises transmitting the selected code over a parallel interconnect.

5. The method of claim 4, wherein said transmitting the selected code over the parallel interconnect comprises transmitting the selected code over a parallel interconnect from a graphics processing unit to a memory device.

6. The method of claim 5, wherein said transmitting the selected code over the parallel interconnect comprises transmitting the selected code over a parallel interconnect from a memory device to a graphics processing unit.

7. The method of claim 4, wherein said selecting the code from among the plurality of codes comprises selecting a code to minimize the amount of data lines switching from a first logical voltage level to a second logical voltage level on the parallel interconnect.

8. The method of claim 4, wherein said selecting the code from among the plurality of codes comprises selecting a code to maximize the amount of data lines at a first logical voltage level on the parallel interconnect.

9. The method of claim 8, wherein the first logical voltage level comprises a logically high voltage level.

10. The method of claim 8, wherein the first logical voltage level comprises a logically low voltage level.

11. A method, comprising:
receiving at least N+2 data bits over a data interconnect; and
decoding the at least N+2 data bits by complementing an N bit base code segment of the at least N+2 bits if a first complement bit field in the N+2 bits is set, complementing a subset of the N bit base code segment if a second complement bit field in the at least N+2 bits is set, complementing a portion of the base code not included in the subset if the first and second complement bits are set, wherein if the first and second complement bits are set the subset of the N bit base code is not complemented.

12. The method of claim 11, wherein said decoding the at least N+2 data bits comprises decoding ten data bits.

13. The method of claim 12, wherein the base code comprises eight data bits.

14. The method of claim 13, wherein the subset of the base code comprises four data bits.

15. The method of claim 11, wherein said receiving said at least N+2 data bits over a data interconnect comprises receiving said at least N+2 data bits over a parallel data interconnect, wherein the received at least N+2 data bits comprise a code selected from among a plurality of codes to minimize the amount of data lines switching from a first logical voltage level to a second logical voltage level on the parallel data interconnect.

16. The method of claim 11, wherein said receiving said at least N+2 data bits over a data interconnect comprises receiving said at least N+2 data bits over a parallel data interconnect, wherein the received at least N+2 data bits comprise a code selected from among a plurality of codes to maximize the amount of data lines at a predetermined logical voltage level on the parallel data interconnect.

17. An apparatus, comprising:
an encoder to encode N data bits by selecting a code from among a plurality of codes associated with the N data bits, wherein the plurality of codes are derived from a base code associated with the N bits and a first complement bit and a second complement bit, wherein the first complement bit, if set, indicates that the base code has been complemented, and wherein the second complement bit, if set, indicates that a subset of the base code has been complemented, wherein if the first and second complement bits are set the subset of the base code is not complemented and the portion of the base code not included in the subset is complemented; and output circuitry to transmit the selected code over a data interconnect.

18. The apparatus of claim 17, wherein the N data bits comprise eight data bits, and wherein the base code comprises eight data bits.

19. The apparatus of claim 17, wherein the data interconnect comprises a parallel data interconnect, the encoder select the code from among the plurality of codes to minimize the amount of data lines switching from a first logical voltage level to a second logical voltage level on the parallel data interconnect.

20. The apparatus of claim 17, wherein the data interconnect comprises a parallel data interconnect, the encoder is to select the code from among the plurality of codes to maximize the amount of data lines at a predetermined logical voltage level on the parallel interconnect.

* * * * *

UNITED STATES PATENT AND TRADEMARK OFFICE
CERTIFICATE OF CORRECTION

PATENT NO. : 7,519,893 B2 Page 1 of 1
APPLICATION NO. : 11/752088
DATED : April 14, 2009
INVENTOR(S) : Russell R. Newcomb and William B. Simms It is certified that error appears in the above-identified patent and that said Letters Patent is hereby corrected as shown below:

In column 18, claim 19, line 2, the word --to-- should be inserted between "encoder" and "select".

In column 18, claim 20, line 8, the word "is" should be removed.

Signed and Sealed this

Thirtieth Day of June, 2009

JOHN DOLL
*Acting Director of the United States Patent and Trademark Office*